US009811475B2

(12) United States Patent
Zmudzinski et al.

(10) Patent No.: US 9,811,475 B2
(45) Date of Patent: Nov. 7, 2017

(54) METHODS AND APPARATUS FOR A SECURE SLEEP STATE

(75) Inventors: Krystof C. Zmudzinski, Forest Grove, OR (US); Matthew E. Hoekstra, Forest Grove, OR (US); John L. Manferdelli, San Francisco, CA (US); Bin Xing, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/538,154

(22) Filed: Jun. 29, 2012

(65) Prior Publication Data

US 2014/0006799 A1 Jan. 2, 2014

(51) Int. Cl.

| | |
|---|---|
| ***G06F 21/00*** | (2013.01) |
| ***G06F 12/14*** | (2006.01) |
| ***G06F 9/44*** | (2006.01) |
| ***G06F 21/57*** | (2013.01) |
| ***G06F 1/32*** | (2006.01) |
| ***G06F 21/62*** | (2013.01) |
| ***G06F 21/81*** | (2013.01) |

(52) U.S. Cl.

CPC ........ *G06F 12/1408* (2013.01); *G06F 1/3206* (2013.01); *G06F 1/3237* (2013.01); *G06F 1/3243* (2013.01); *G06F 9/4418* (2013.01); *G06F 21/57* (2013.01); *G06F 21/6209* (2013.01); *G06F 21/81* (2013.01); *G06F 1/3287* (2013.01); *G06F 2221/2107* (2013.01); *G06F 2221/2143* (2013.01); *Y02B 60/1221* (2013.01); *Y02B 60/1239* (2013.01); *Y02B 60/1282* (2013.01); *Y02B 60/32* (2013.01)

(58) Field of Classification Search

None

See application file for complete search history.

(56) References Cited

U.S. PATENT DOCUMENTS

| | | | | |
|---|---|---|---|---|
| 7,210,045 | B2 | 4/2007 | Dunstan | |
| 2004/0003273 | A1* | 1/2004 | Grawrock | 713/193 |
| 2005/0044433 | A1 | 2/2005 | Dunstan | |
| 2008/0133939 | A1* | 6/2008 | Danilak | 713/193 |

(Continued)

FOREIGN PATENT DOCUMENTS

| | | |
|---|---|---|
| CN | 1694032 | 11/2005 |
| CN | 101091147 | 12/2007 |

OTHER PUBLICATIONS

Liang, Min, et al., "Full Disk Encryption based on Virtual Machine and Key Recovery Scheme." Proceedings of 2011 International Conference on Computer Science and Information Technology (ICCSIT 2011). 2011, p. 214-223.*

(Continued)

*Primary Examiner* — Jeffery Williams

(74) *Attorney, Agent, or Firm* — Hanley, Flight & Zimmerman, LLC

(57) ABSTRACT

Methods and apparatus for a secure sleep state are disclosed. An example method includes, in response to an initiation of a sleep state of a computing platform, encrypting a memory of the computing platform; and decrypting the memory when resuming the computing platform from the sleep state, wherein placing the computing platform in the sleep state includes powering down a portion of the computing platform and preserving a state of the computing platform.

27 Claims, 9 Drawing Sheets

START 300
BOOT BIOS 302
RESUME FROM SLEEP MODE? 304
306 RESUME FROM SECURE SLEEP MODE?
RESUME OPERATING SYSTEM 308
SECURE SLEEP MODE ENABLED? 310
GET KEYSTROKE 312
TIMEOUT? 314
ENTER SETUP? 316
INITIATE BIOS SETUP INTERFACE 318
NEW PASSPHRASE ENTERED? 320
HASH PASSPHRASE AND STORE HASH VALUE 322
DERIVE WRAPPING KEY FROM PASSPHRASE AND DESTROY PASSPHRASE 324
BOOT OPERATING SYSTEM 326
RUN OPERATING SYSTEM 328
FIG. 3B
FIG. 3D
FIG. 3C
YES
NO

(56) References Cited

U.S. PATENT DOCUMENTS

| | | | | |
|---|---|---|---|---|
| 2010/0106886 | A1 | 4/2010 | Marcu et al. | |
| 2010/0151919 | A1 | 6/2010 | Caskey | |
| 2010/0162020 | A1 | 6/2010 | Maule et al. | |
| 2010/0174925 | A1 | 7/2010 | Barde | |
| 2011/0001603 | A1* | 1/2011 | Willis | 340/5.2 |
| 2011/0246767 | A1* | 10/2011 | Chaturvedi et al. | 713/164 |
| 2012/0133484 | A1* | 5/2012 | Griffin | 340/5.54 |

OTHER PUBLICATIONS

Yushi Omote et al., "Hypervisor-based background encryption", In Proceedings of the 27th Annual ACM Symposium on Applied Computing (SAC '12), 2012, ACM, p. 1829-1836.*

Mountain Jr., Joseph, "Operational Virtualized Environments", Gnostech Inc., 23rd Systems and Software Technology Conference (SSTC), 2011, p. 1-30.* techtarget.com, "Definition—virtual machine (VM)", 2017, http://searchservervirtualization.techtarget.com/definition/virtual-machine, p. 1-7.*

Patent Cooperation Treaty, "The International Search Report," issued in connection with Application No. PCT/US2013/045853, dated Sep. 27, 2013, 5 pages.

Patent Cooperation Treaty, "Written Opinion of the International Searching Authority," issued in connection with Application No. PCT/US2013/045853, dated Sep. 27, 2013, 6 pages.

Patent Cooperation Treaty, "International Preliminary Report on Patentability," issued in connection with Application No. PCT/US2013/045853, dated Dec. 31, 2014, 7 pages.

"Cold boot attack," en.wikipedia.org/wiki/Cold_boot_attack, retrieved from the Internet on Oct. 1, 2013, 6 pages.

Halderman et al., "Lest We Remember: Cold Boot Attacks on Encryption Keys," Feb. 21, 2008, 16 pages, Proc. 2008 USENIX Security Symposium.

European Patent Office, "Extended European Search Report," issued in connection with European Patent Application No. 13810562.2, dated Nov. 23, 2015, 6 pages.

The State Intellectual Property Office of China, "1st Office Action," issued in connection with application No. 201380028646.4 dated May 26, 2016, 7 pages.

* cited by examiner

METHODS AND APPARATUS FOR A SECURE SLEEP STATE

FIELD OF THE DISCLOSURE

This disclosure relates generally to power state management and, more particularly, to methods and apparatus for a secure sleep state.

BACKGROUND

Many computing platforms, such as desktop computers and laptops, can be placed in one or more power states other than an ON state or an OFF state. For example, some computing platforms can be placed in a hibernation state. Placing a computing platform in hibernation involves powering down the system while preserving a state of the system (e.g., by writing contents of Random Access Memory (RAM) to a hard disk). Alternatively, some computing platforms can be placed in a sleep state. Placing a computing platform in a sleep state involves cutting power to many, but not all components of the system and preserving the state of the system. Typically, entering an ON state from the sleep state is less time consuming than entering the ON state from the hibernation state.

DETAILED DESCRIPTION

Figure 1:
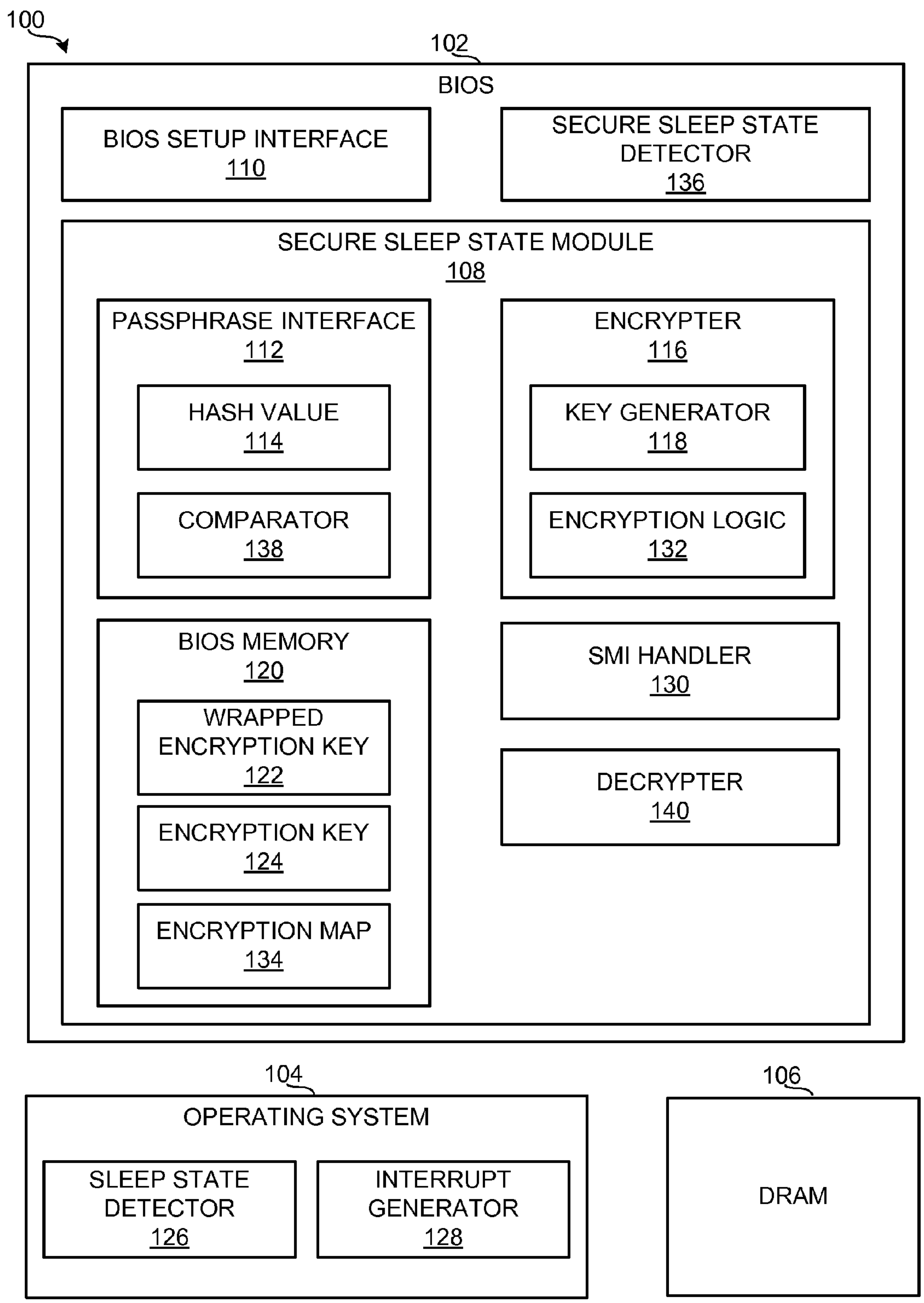
FIG. 1 is a block diagram of an example computing platform including an example secure sleep state module disclosed herein.

Computing platforms such as desktop computers and laptops store information that a corresponding user may deem secret, sensitive, and/or otherwise not fit for public access. Some computing platforms include full disk encryption capabilities to protect such data when the computing platforms are placed in an OFF state (e.g., fully turned off) or a hibernation state (e.g., the system being powered down while preserving a state of the system). That is, unless the user has placed the computing platform in an OFF state or a hibernation state, information on a lost or stolen computer can be accessed. However, having to place the computing platform in the OFF state or the hibernation state has drawbacks. For example, the OFF state does not preserve the state of the computing platform and, thus, the user is forced to save all open document(s) (or other type of unsaved data) and exit all application(s) (or other type of program). Further, booting the computing platform from the OFF state requires a significant amount of time and requires the user to reopen document(s) and/or application(s). In many instances, the user may have forgotten the state of the computing platform and/or be unable to navigate to the previous state of the computing platform. While the hibernation state preserves the state of the computing platform, resuming from the hibernation state also consumes a significant amount of time, especially on laptops, notebooks, netbooks, etc.

A sleep state, which is sometimes referred to as the S3 power state, avoids these drawbacks. For example, resuming from the sleep state is relatively much faster than resuming from an OFF state or a hibernation (e.g., resuming from the sleep state can be substantially instant) and enables the user to immediately resume working on the open document(s) and/or application(s). However, sensitive information on a computing platform in the sleep state is vulnerable to unwanted access (e.g., in the case of a stolen or lost computing platform). For example, the Dynamic Random Access Memory (DRAM) of a computing platform in the sleep state can be accessed by moving the DRAM to another computer where the DRAM can be scanned. Alternatively, the DRAM of a computing platform in the sleep state can be accessed by performing a cold boot attack. Moreover, if such an attack results in the attacker finding encryption keys in the DRAM, all data on the disk can be accessed.

Example methods, apparatus, and articles of manufacture disclosed herein provide a secure sleep state that provides protection of data stored on a computing platform while in a sleep state. As described in greater detail below, example methods, apparatus, and articles of manufacture disclosed herein enable users to activate the secure sleep state such that each time a corresponding computing platform is placed in the sleep state, data is encrypted. Further, example methods, apparatus, and articles of manufacture disclosed herein detect when the computing platform is taken out of the sleep state (e.g., into an ON state) and, in response, decrypts the secure data if the user provides the proper credentials. Thus, using the secure sleep state provided by example method, apparatus, and articles of manufacture disclosed herein, users can place the computing platform in the sleep state to avoid the drawbacks of the OFF state and the hibernation, and at the same time protect the data stored on the computing platform from unwanted access.

FIG. 1 illustrates an example computing platform 100 in which example method, apparatus, and/or articles of manufacture disclosed herein can be implemented. FIG. 1 includes a Basic Input/Output System (BIOS) 102, an operating system (OS) 104, and DRAM 106. However, the example computing platform 100 may include additional component(s), such as additional or alternative types of memory, a network interface, data buses, processor(s), etc. In brief, the BIOS 102 boots the computing platform 100 such that the operating system 104 can take control of, for example, access to memory and execution of instructions (e.g., via a processor). In the illustrated example, the DRAM 106 implements the main memory of the computing platform used to store data associated with, for example, executing application(s), documents, etc.

To provide the example computing platform 100 the secure sleep state disclosed herein, the example BIOS 102 includes an example secure sleep state module 108. Although implemented in the BIOS 102 in the example of FIG. 1, the example secure sleep state module 108 can be implemented in connection with additional or alternative components, such as an Extensible Firmware Interface (EFI). As described in greater detail below, the example secure sleep state module 108 of FIG. 1 detects when the computing platform 100 is being placed in a sleep state and, in response, encrypts the DRAM 106 such that the sleep state is secure (e.g., includes protection over the data of the DRAM 106). Further, as described in greater detail below, the example secure sleep state module 108 decrypts the DRAM 106 when the computing platform 100 is being resumed from the secure sleep state.

In the illustrated example of FIG. 1, the secure sleep state module 108 interacts with and/or utilizes a BIOS setup interface 110 to enable a user to activate the secure sleep state. The example BIOS setup interface 110 of FIG. 1 is accessed by the user pressing a dedicated key (e.g., on a keyboard) while the platform 100 is booting. The example BIOS setup interface 110 presents a menu to the user including an option to enable or activate the secure sleep state. In the example of FIG. 1, the option instructs the user to provide a passphrase (e.g., a password that meets minimum security strength requirements as dictated by, for example, rules stored in the BIOS 102) that the user will be required to enter when resuming the platform 100 from the secure sleep state. When the secure sleep state is currently inactive or disabled, the user providing the passphrase acts as the activation or enablement of the secure sleep state. Additionally or alternatively, the example BIOS setup interface 110 allows or requires (e.g., periodically) the user to change the passphrase. The example BIOS setup interface 110 may also provide the user with instructions and other information regarding the secure sleep state and how to utilize the same. For example, the BIOS setup interface 110 informs the user that the passphrase will need to be entered each time the platform 100 resumes (e.g., from the secure sleep state). When a passphrase has been entered and/or the secure sleep state is otherwise active, the BIOS setup interface 110 is protected from access by, for example, requiring the user to enter the current passphrase before having access to the menu of the BIOS setup interface 110.

The example secure sleep state module 108 includes a passphrase interface 112 that receives and/or otherwise obtains the passphrase entered by the user into the BIOS setup interface 110. The example passphrase interface 112 hashes the passphrase (e.g., performs a hash function on the passphrase) and stores a resulting hash value 114. In the illustrated example, the passphrase itself is not stored. Instead, the stored hash value 114 represents the passphrase according to the hash function that was performed on the passphrase. The example secure sleep state module 108 includes an encrypter 116 that utilizes the stored hash value 114 to encrypt data of the DRAM 106. In particular, the example encrypter 116 includes a key generator 118 that generates a wrapping key using the stored hash value 114. The example key generator 118 also generates an encryption key using, for example, a random number generator in conjunction with an encryption engine. Having generated a wrapping key from the stored hash value 114 and a random encryption key, the example key generator 118 of FIG. 1 wraps the random encryption key in the wrapping key. A BIOS memory 120 (e.g., System Management Random Access Memory (SMRAM)) is used to store the wrapped encryption key 122 and the encryption key 124. The example BIOS memory 120 of FIG. 1 is implemented by flash memory. As described above, the passphrase is destroyed (e.g., not stored). Further, the wrapping key 122 used to wrap the encryption key 124 is also destroyed. As described below, the encryption key 124 is used to protect the data of the DRAM 106 when entering the secure sleep state and the wrapped encryption key 122 is used to provide access to the protected DRAM (e.g., to an authorized user) when resuming from the secure sleep state.

After the passphrase is provided to activate the secure sleep state, the BIOS 102 passes control to the OS 104. The OS 104 controls the platform 100 during normal operation, during which data of the DRAM 106 is likely modified (e.g., in response to execution of application(s) and associated document(s)). The OS 104 continues to control the platform until, for example, the user initiates a sleep state. The user can initiate a sleep state by, for example, closing a lid of the platform (e.g., when the platform 100 is implemented by a laptop computer), pressing a power or sleep button, or selecting the sleep state from a menu managed by the OS 104. Alternatively, the sleep state can be initiated in response to a period of inactivity. In the illustrated example of FIG. 1, the action taken by the user to initiate the sleep state (e.g., closing a lid or pressing a button) or the period of inactivity generates a System Control Interrupt (SCI) that is intercepted by the OS 104 and/or results in a function call (e.g., via selecting a menu option dedicated to the sleep state) to the OS 104. In the example of FIG. 1, the OS 104 includes a sleep state detector 126 representative of the detection of the user initiating the sleep state on the platform 100. In response to the sleep state detector 126 determining that the sleep state has been initiated, the OS prepares the platform 100 for the sleep state and writes a value to a dedicated Advanced Configuration and Power Interface (ACPI) register. In the illustrated example, writing to the ACPI causes an interrupt generator 128 to generate a System Management Interrupt (SMI) corresponding to the sleep state initiation.

The example secure sleep state module 108 includes an SMI handler 130 (e.g., a handler dedicated to the type of interrupt generated by the interrupt generator 128) that responds to the SMI generated by the interrupt generator 128 of the OS 104. The example SMI handler 130 of FIG. 1 determines whether the secure sleep state is enabled by, for example, checking if a hash value is currently stored in the BIOS 102. In the illustrated example, the SMI handler 130 determines whether the hash value 114 of the passphrase interface 112 is anything but null (or any other value representative of a lack of a hash being stored). If so, the example SMI handler 130 determines that the secure sleep state is enabled and that the DRAM 106 is to be encrypted before the sleep state is entered. The example SMI handler 130 triggers encryption logic 132 to encrypt the DRAM 106. In particular, the encryption logic 132 applies the encryption key 124 stored in the BIOS memory 120 to the data of the DRAM 106 using any suitable encryption technique. After the DRAM 106 has been encrypted, the encryption key 124 is destroyed. On the other hand, the wrapped encryption key 122 is preserved. In some examples, the BIOS memory 120 is not encrypted such that access to the wrapped encryption key 122 is possible upon resuming from the secure sleep state.

The example encryption logic 132 also stores an encryption map 134 in the BIOS memory 120 representative of critical DRAM regions that have to be decrypted before the OS 104 can be resumed (e.g., from the secure sleep state). In particular, the example encryption map 134 of FIG. 1 includes information on locations and size of data structures (e.g., page tables, descriptor tables, and/or other data structures) that will be needed for the OS 104 to resume and run upon the platform 100. As described in greater detail below in connection with FIGS. 4 and 5, the example encryption map 134 can be used in a decryption process performed when the platform 100 is being resumed from the secure sleep state.

When the encryption logic 132 has completed the encryption of the DRAM 106 and creation of the encryption map 134, the platform 100 is placed in the secure sleep state. The user can resume the platform 100 (e.g., take the platform 100 out of the secure sleep state) by, for example, opening a lid, pressing a dedicated button, etc. In response to such an action, the BIOS 102 begins booting the platform 100. The example BIOS 102 of FIG. 1 includes a secure sleep state detector 136 to determine whether the platform 100 is resuming from a secure sleep state or an unsecure sleep state (e.g., with the sleep protection of the DRAM 106 provided by the secure sleep state module 108 disabled). In the illustrated example, the secure sleep state detector 136 checks the passphrase interface 122 for the presence of a hash value. That is, the example secure sleep state detector 136 of FIG. 1 determines if anything but null (or any other value representative of a lack of a hash being stored) is stored at the hash value 114. The presence of the hash value 114 indicates that the secure sleep state is enabled and that the DRAM 106 is to be decrypted. The lack of a hash value indicates that the secure sleep state was not entered and the DRAM does not have to be decrypted.

When the secure sleep state detector 136 determines that the platform 100 is being resumed from the secure sleep state, the example passphrase interface 112 of FIG. 1 prompts the user for the passphrase corresponding to the secure sleep state. The entry provided in response to the prompt is compared to the hash value 114 by a comparator 138. The comparator 138 determines whether the user-provided entry is a match of the hash value 114, which corresponds to the passphrase previously provided by the user to active or enable the secure sleep state. If the user-provided entry does not match the stored hash value 114, the user is denied access to the platform 100. In some examples, the user may be provided a set number of tries to enter the correct passphrase.

Figure 2:
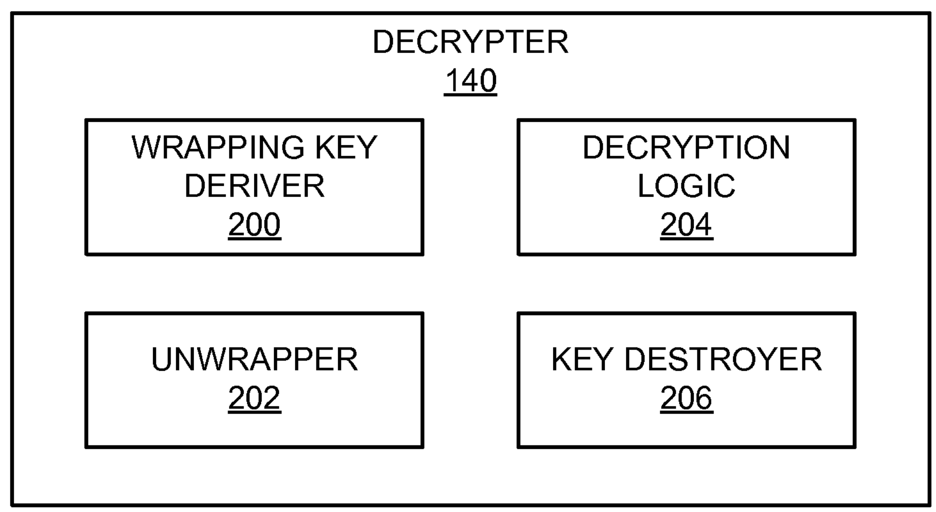
FIG. 2 is a block diagram of a first example implementation of the example decrypter of FIG. 1.

On the other hand, if the user-provided entry matches the stored hash value 114, a decrypter 140 of the example secure sleep state module 108 is triggered. The example decrypter 140 decodes the encryption of the DRAM 106 such that the OS 104 has access to the data of the DRAM 106 in the state in which the DRAM 106 was before the sleep state was entered. A first example implementation of the decrypter 140 is shown in FIG. 2. The example decrypter 140 of FIG. 2 includes a wrapping key deriver 200 that re-derives the wrapping key from the passphrase provided by the user in response to the prompt of the passphrase interface 112. As described above, the passphrase that was provided by the user to initiate or activate the secure sleep state was destroyed after being used to generate the encryption key 124. Therefore, when resuming from the secure sleep state, the example wrapping key deriver 200 of the decrypter 140 uses the passphrase that was provided by the user upon resuming the platform 100, which was determined to match the previously provided passphrase (e.g., via comparison to the stored hash value 114).

The example decrypter 140 of FIG. 2 also includes an unwrapper 202 to use the re-derived wrapping key to unwrap the wrapped encryption key 122 of the BIOS memory 120. As described above, the wrapped encryption key 122 is preserved after encrypting the DRAM 106 and placing the platform in the secure sleep state such that the encryption key can be unwrapped and used by the decrypter 140 when resuming from the secure sleep state. Thus, the example unwrapper 202 of FIG. 2 uses the preserved wrapped version 122 of the encryption key and re-derived wrapping key (from the wrapping key deriver 200) to generate the encryption key used by the encryption logic 132 to secure the DRAM 106.

The example decrypter 140 of FIG. 2 includes decryption logic 204 that uses the obtained encryption key to decrypt the DRAM 106 such that the OS 104 will have access to the DRAM 106 when the BIOS 102 passes control to the OS 104. After the decryption logic 204 has decrypted the DRAM 106, a key destroyer 206 destroys the encryption key used by the decrypter 140 and the wrapped encryption key 122 of the BIOS memory 120. In some scenarios, the platform 100 may be placed in the sleep state before the decryption logic 204 has completed the decryption of the DRAM 106. In such instances, the key destroyer 206 does not destroy the encryption key or the wrapped encryption key 122. Rather, the keys are preserved such that the DRAM 106 can be decrypted when the platform 100 is resumed from (second) sleep state.

As the wrapped encryption key 122 is destroyed during the decryption process and the encryption key 124 is destroyed after being used to encrypt the DRAM 106 and after re-deriving the encryption key for use by the decrypter 140, a new encryption key (different from the previous encryption key) and a new wrapped encryption key are needed for use when the platform 100 is again placed in the sleep state (e.g., the next time the user closes the lid, presses a dedicated sleep button, selects the sleep state from a menu, etc.). Accordingly, the passphrase that was provided by the user in response to the prompt of the passphrase interface 112 to gain access to the platform is used to by the key generator 118 to generate a wrapping key. The key generator 118 also generates a random encryption key. Because a random functionality (e.g., a random number generator) is used to generate the encryption key, the encryption key from one iteration of the secure sleep state is different from another iteration of the secure sleep state (or at least different from the next iteration, as random value may repeat over many, perhaps millions, of iterations). As before, the wrapping key is used to wrap the randomly generated encryption key and the wrapped encryption key 122 and the encryption key 122 are stored in the BIOS memory 120. Further, as before, the wrapping key and the passphrase are destroyed.

The BIOS 102 then passes control to the OS 104, which is resumed such that the platform 100 operates in the state from which the secure sleep state was entered. As described above, the OS 104 continues to manage operation of the platform 100 until the power state of the platform 100 is changed (e.g., by the user). If the change corresponds to a placement of the platform 100 in the sleep state (e.g., by user action, by reaching an inactivity threshold, etc.), the sleep state detector 126 determines whether the secure sleep state is enabled and, if so, the interrupt generator 128 generates an interrupt that is handled by the SMI handler 130 of the secure sleep state module 108. The example SMI handler 130 triggers the encrypter 116 to encrypt the DRAM 106 again, this time using the new encryption key 124. The data of the DRAM 106 is protected once again while the platform 100 is in the sleep state. Thus, the example secure sleep state module 108 provides repeated protection of the DRAM 106 each time the platform 100 is placed in the sleep state.

While an example manner of implementing the platform 100 has been illustrated in FIG. 1, one or more of the elements, processes and/or devices illustrated in FIG. 1 may be combined, divided, re-arranged, omitted, eliminated and/or implemented in any other way. Further, the example secure sleep state module 108, the example BIOS setup interface 110, the example passphrase interface 112, the example encrypter 116, the example key generator 118, the example sleep state detector 126, the example interrupt generator 128, the example SMI handler 130, the example encryption logic 132, the example secure sleep state detector 136, the example comparator 138, the example decrypter 140 and/or, more generally, the example platform 100 of FIG. 1 may be implemented by hardware, software, firmware and/or any combination of hardware, software and/or firmware. Thus, for example, any of the example secure sleep state module 108, the example BIOS setup interface 110, the example passphrase interface 112, the example encrypter 116, the example key generator 118, the example sleep state detector 126, the example interrupt generator 128, the example SMI handler 130, the example encryption logic 132, the example secure sleep state detector, 136, the example comparator 138, the example decrypter 140 and/or, more generally, the example platform 100 of FIG. 1 could be implemented by one or more circuit(s), programmable processor(s), application specific integrated circuit(s) (ASIC (s)), programmable logic device(s) (PLD(s)) and/or field programmable logic device(s) (FPLD(s)), etc. When any of the appended system or apparatus claims of this patent are read to cover a purely software and/or firmware implementation, at least one of the example secure sleep state module 108, the example BIOS setup interface 110, the example passphrase interface 112, the example encrypter 116, the example key generator 118, the example sleep state detector 126, the example interrupt generator 128, the example SMI handler 130, the example encryption logic 132, the example secure sleep state detector, 136, the example comparator 138, the example decrypter 140 and/or, more generally, the example platform 100 of FIG. 1 are hereby expressly defined to include a tangible computer readable storage medium such as a memory, DVD, CD, Blu-ray, etc. storing the software and/or firmware. Further still, the example platform 100 of FIG. 1 may include one or more elements, processes and/or devices in addition to, or instead of, those illustrated in FIG. 1, and/or may include more than one of any or all of the illustrated elements, processes and devices.

While an example manner of implementing the decrypter 140 of FIG. 1 has been illustrated in FIG. 2, one or more of the elements, processes and/or devices illustrated in FIG. 2 may be combined, divided, re-arranged, omitted, eliminated and/or implemented in any other way. Further, the example wrapping key deriver 200, the example unwrapper 202, the example decryption logic 204, the example key destroyer 206 and/or, more generally, the example decrypter 140 of FIG. 2 may be implemented by hardware, software, firmware and/or any combination of hardware, software and/or firmware. Thus, for example, any of the example wrapping key deriver 200, the example unwrapper 202, the example decryption logic 204, the example key destroyer 206 and/or, more generally, the example decrypter 140 of FIG. 2 could be implemented by one or more circuit(s), programmable processor(s), application specific integrated circuit(s) (ASIC (s)), programmable logic device(s) (PLD(s)) and/or field programmable logic device(s) (FPLD(s)), etc. When any of the appended system or apparatus claims of this patent are read to cover a purely software and/or firmware implementation, at least one of the example wrapping key deriver 200, the example unwrapper 202, the example decryption logic 204, the example key destroyer 206 and/or, more generally, the example decrypter 140 of FIG. 2 are hereby expressly defined to include a tangible computer readable storage medium such as a memory, DVD, CD, Blu-ray, etc. storing the software and/or firmware. Further still, the example decrypter 140 of FIG. 2 may include one or more elements, processes and/or devices in addition to, or instead of, those illustrated in FIG. 2, and/or may include more than one of any or all of the illustrated elements, processes and devices.

FIGS. 3A-D are flowcharts representative of example machine readable instructions for implementing the example platform 100 of FIGS. 1 and/or 2. In the example flowcharts of FIGS. 3A-D, the machine readable instructions comprise program(s) for execution by a processor such as the processor 612 shown in the example computer 600 discussed below in connection with FIG. 6. The program(s) may be embodied in software stored on a tangible computer readable medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program(s) is described with reference to the flowcharts illustrated in FIGS. 3A-D, many other methods of implementing the example platform 100 may alternatively be used. For example, the order of execution of the blocks may be changed, and/or some of the blocks described may be changed, eliminated, or combined.

As mentioned above, the example processes of FIGS. 3A-D may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 3A-D may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 3A:
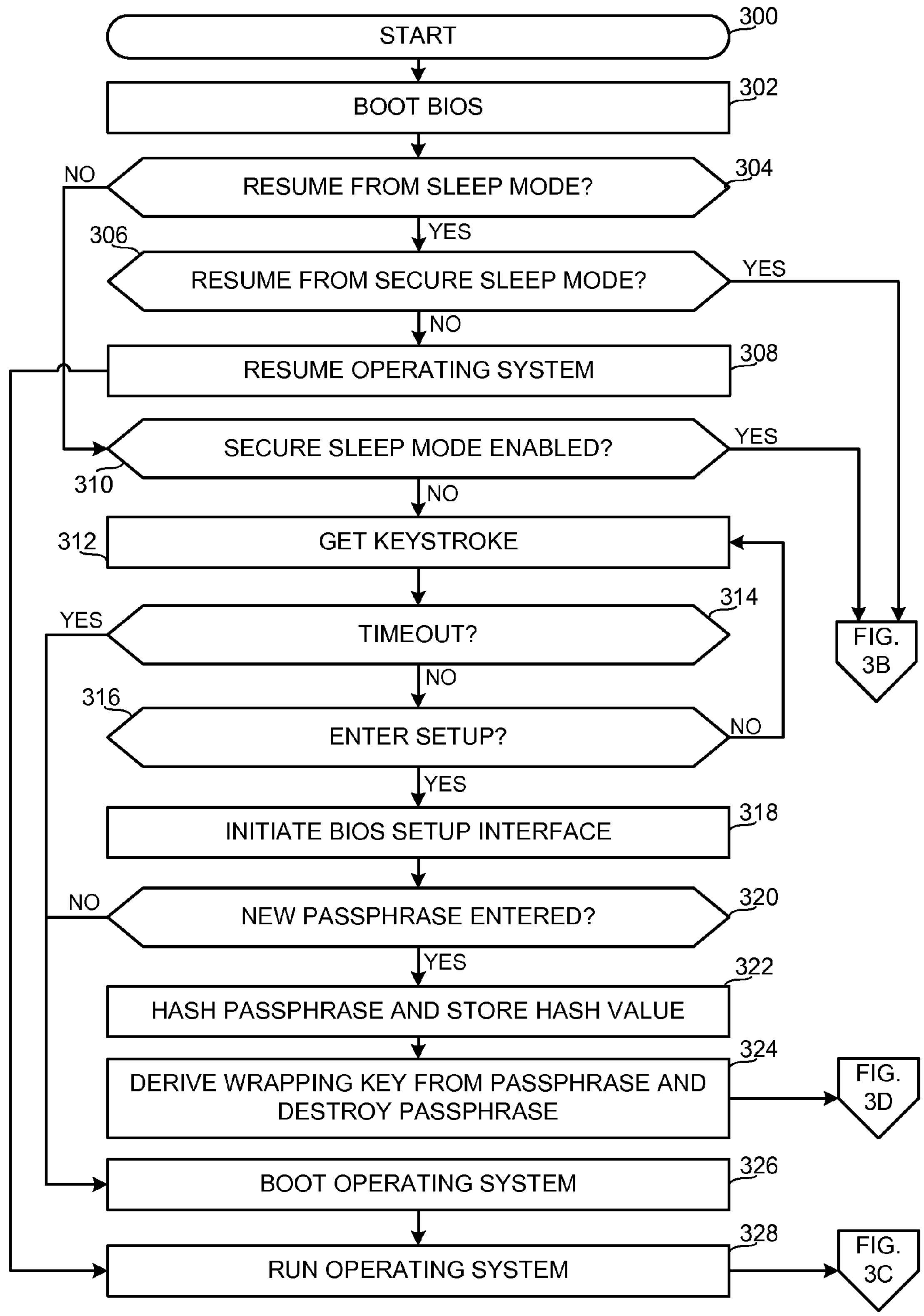
FIGS. 3A-3D are flowcharts representative of example machine readable instructions that may be executed to implement the example secure sleep state module of FIG. 1.
Figure 3B:
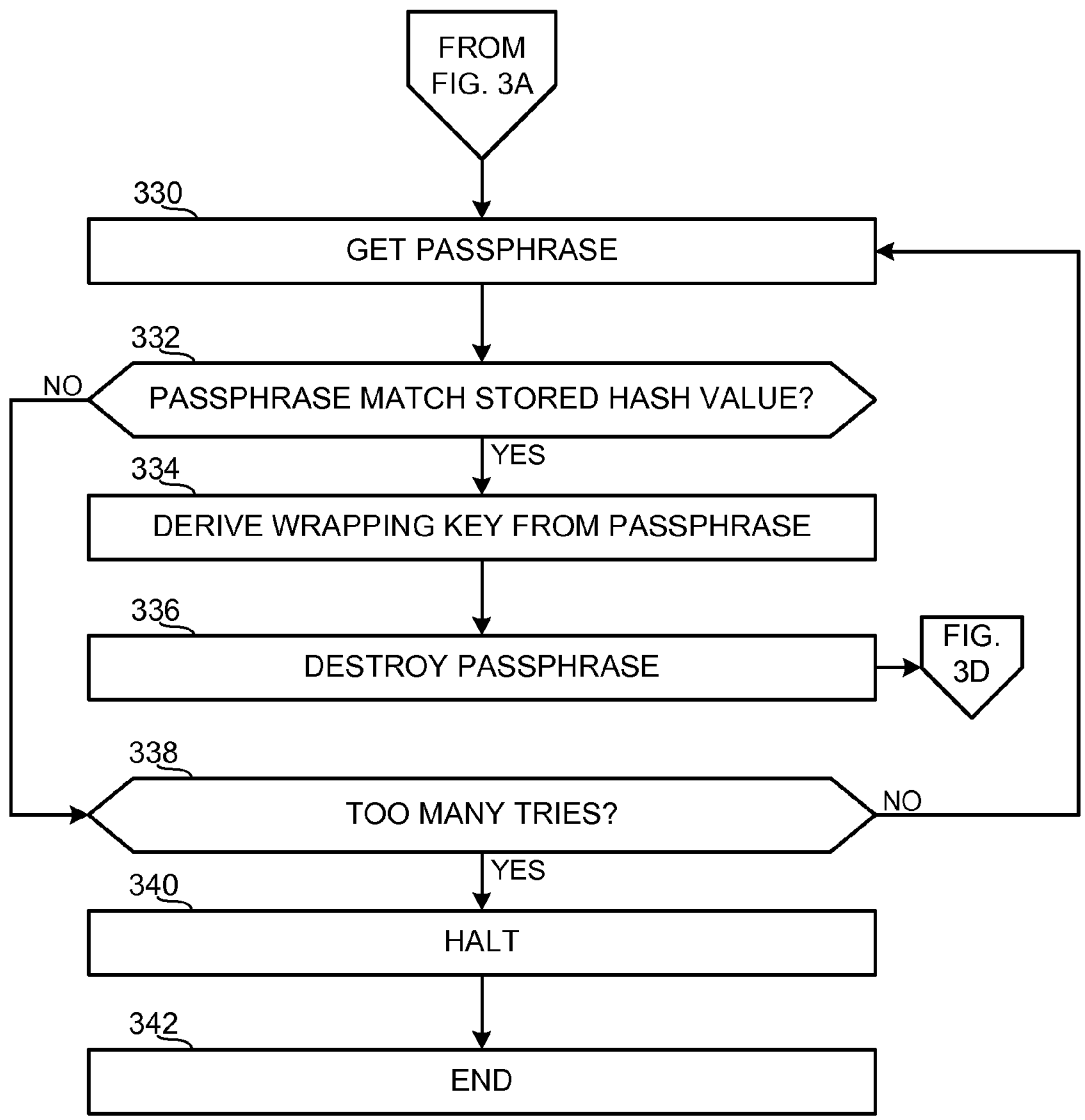
Figure 3C:
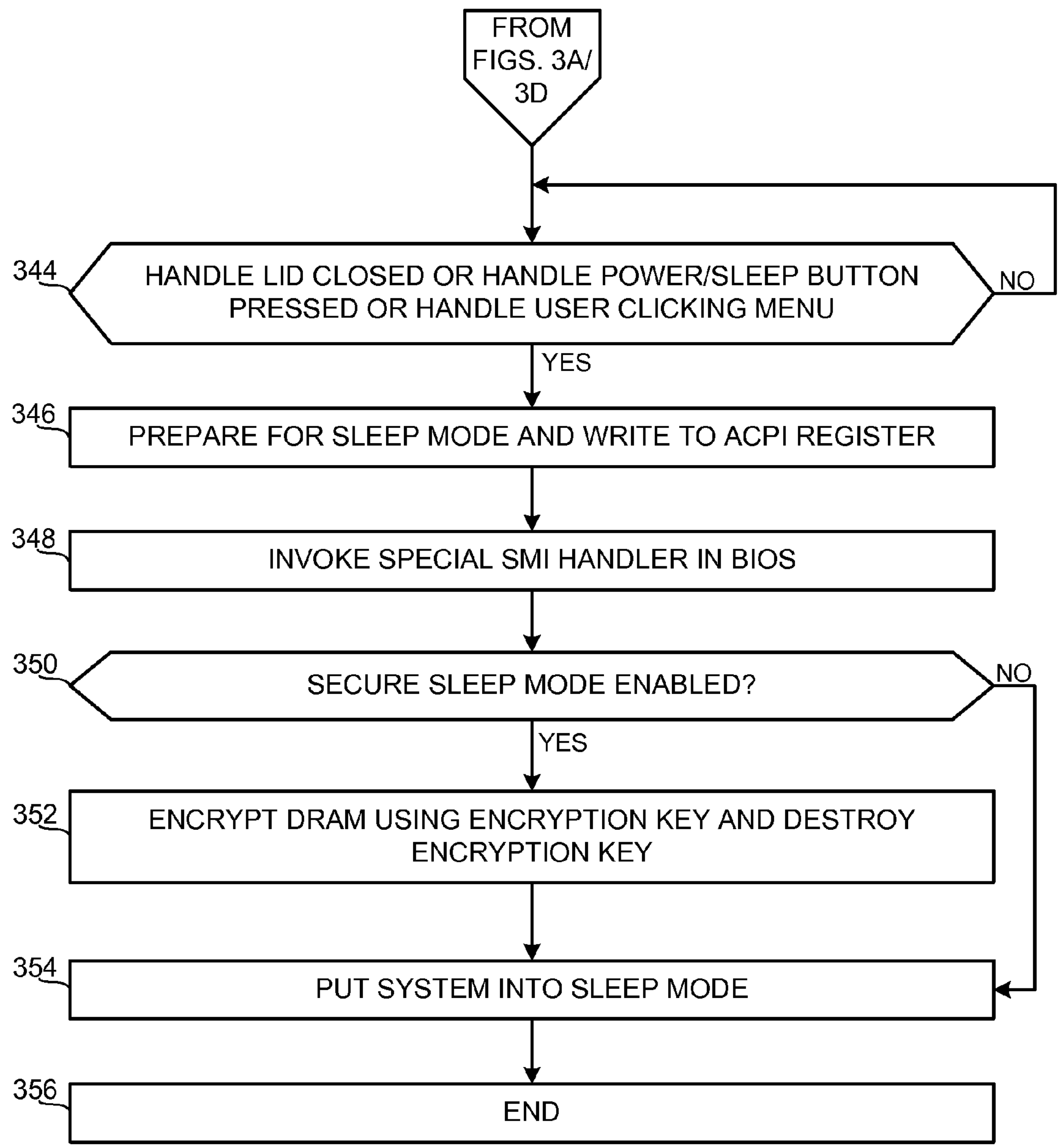
Figure 3D:
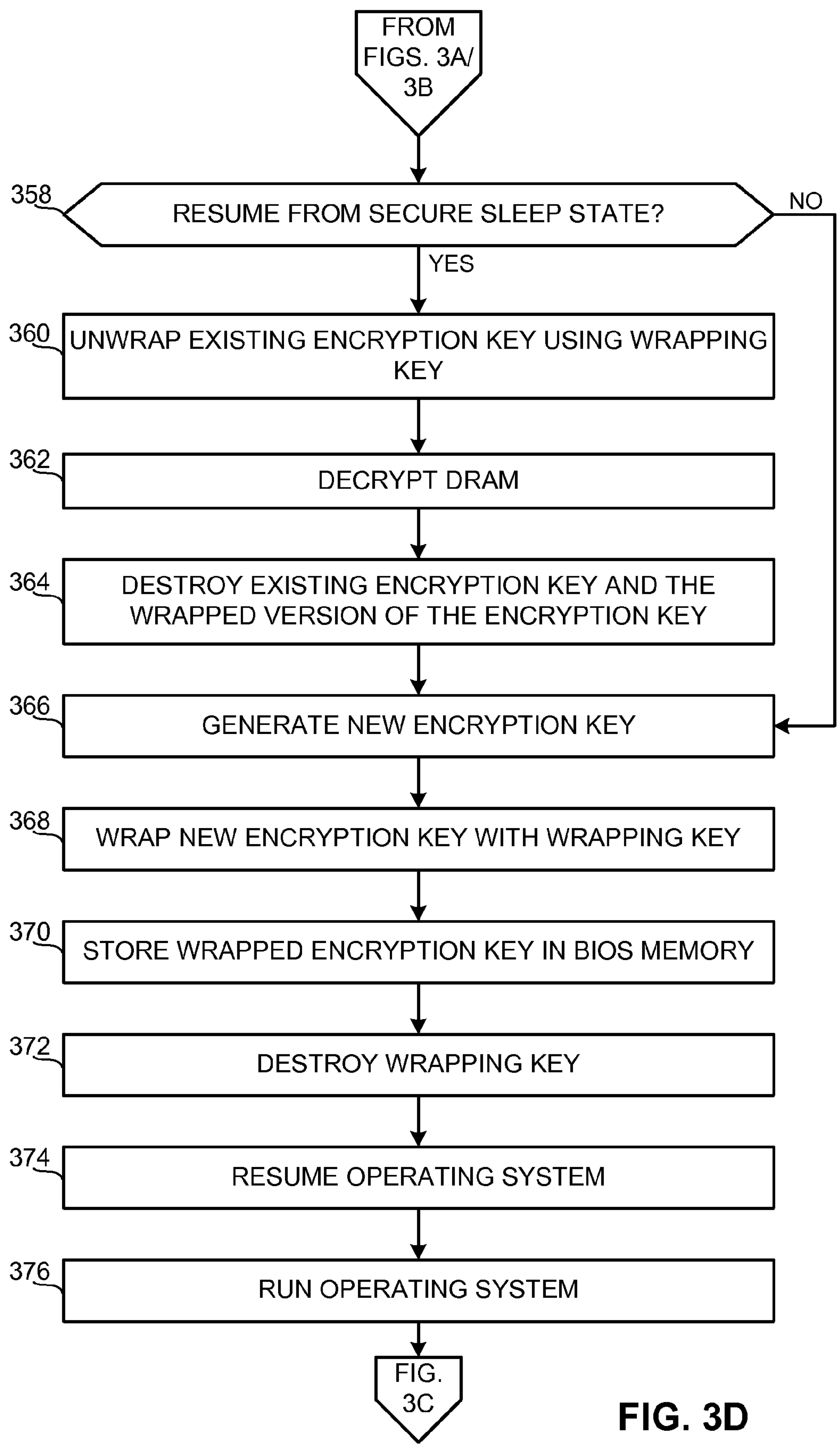

FIG. 3A begins with the platform 100 being turned on (e.g., by a user) (block 300). The BIOS 102 is booted to initiate one or more processes such as, for example, a power-on self test (POST) and/or any other suitable procedures related to booting the platform 100 (block 302). If the BIOS 102 determines that the platform 100 is being resumed from a sleep state (block 304), the example secure sleep state detector 136 of FIG. 1 determines whether the sleep state from which the platform 100 is being resumed is a secure sleep state (block 306). For example, the secure sleep state detector 136 determines whether a hash value is stored in connection with the passphrase interface 112 of FIG. 1. If the sleep state from which the platform 100 is being resumed is a secure sleep state (block 306), control passes to FIG. 3B which is described in further detail below. If the sleep state from which the platform 100 is being resumed is not a secure sleep state (block 306), the OS 104 is resumed (block 308). Further, the OS 104 is executed (block 328) and control passes to FIG. 3C which is described in further detail below.

Referring back to block 304, if the platform 100 is not being resumed from a sleep state, the example secure sleep state module 108 determines whether the secure sleep state provided thereby is currently enabled (block 310). If the secure sleep state is enabled (block 310), control passes to FIG. 3B which is described below. If the secure sleep state is not enabled (block 310), the user may enter the BIOS setup interface 110 to enable the secure sleep state. To determine whether the BIOS setup interface 110 has been activated by the user, a keystroke (e.g., from a keyboard) is captured (block 312). If too much time has passed corresponding to a timeout (block 314), control proceeds to block 326 and the OS 104 is booted. Otherwise, the BIOS setup interface 110 determines whether any entered keystroke corresponds to a request to enter the BIOS setup interface 110 (block 316). If not, additional keystroke(s) are captured (block 312) and the BIOS 102 again determines whether a timeout has occurred (block 314).

When the user has engaged the BIOS setup interface 110 (block 316), the BIOS interface 110 presents a menu to the user (block 318). The passphrase interface 112 determines whether the user has entered a passphrase into the presented menu to activate or enable the secure sleep state functionality disclosed herein (block 320). If no such passphrase is entered into the BIOS setup interface 110 (block 320), the OS 104 is booted (block 326) and executed (block 328). On the other hand, if a passphrase is entered into the BIOS setup interface 110 corresponding to an activation of the secure sleep state (block 320), that passphrase is hashed and the resulting hash value 114 is stored (block 322). Furthermore, the key generator 118 of the encrypter 116 generates a wrapping key from the passphrase and destroys the passphrase (block 324). Control then passes to FIG. 3D which is described below.

Referring now to FIG. 3B, as described above, control passes to FIG. 3B when the platform 100 is resuming from the secure sleep state (block 306) or when the platform 100 is resuming from a state other than the sleep state and the secure sleep state is enabled (block 310). Thus, FIG. 3B begins with the passphrase interface 112 obtaining a passphrase from the user (block 330). Because the secure sleep state is enabled, the user is required to enter the correct passphrase to gain access to the data of the platform 100 (e.g., the DRAM 106). When the passphrase is received from the user, the comparator 138 determines whether the entered passphrase matches the stored hash value 114 (block 332). If the received passphrase does not correspond to the stored hash value 114, the user is provided a certain number of tries to re-enter the passphrase. If the incorrect passphrase has been entered too many times (e.g., exceeding the allowed number of tries) (block 338), the login process is halted (block 340). Further, access to the platform 100 is denied and the illustrated example ends (block 342).

Referring back to block 332, if the passphrase entered by the user corresponds to the stored hash value 114, the key generator 118 derives a wrapping key from the entered passphrase (block 334). Further, the entered passphrase is destroyed (block 336). Control then passes to FIG. 3D which is described below.

Regarding FIG. 3C, as described above, control is passed to FIG. 3C when the OS 104 has begun running and the platform 100 is executing application(s) and/or document(s). In other words, control passes to FIG. 3C when the platform 100 is in an ON state. When in the ON state, the user can decide to place the platform in a sleep state to, for example, preserve the state of the platform while significantly lowering the power consumption of the platform 100 for a period of time. To do so, the user can, for example, close a lid, press a dedicated button, or select the sleep state from a menu managed by the OS 104. When the sleep state detector 126 determines that the user has taken such an action (block 344), the OS 104 prepares the platform 100 for the sleep state and writes to corresponding ACPI register (block 346). As described above, the write to the ACPI register causes the interrupt generator 128 to invoke the SMI handler 130 of the secure sleep state module 108 (block 348).

In response, the SMI handler 130 determines whether the secure sleep state is enabled by checking if there is a hash value stored in connection with the passphrase interface 112 (or any other component tasked with storing the hash value 114) (block 350). If the secure sleep state is not enabled, the SMI handler 130 places the platform 100 into the sleep state without encrypting the DRAM 106 (block 354). Otherwise, the encryption logic 132 uses the stored encryption key 124 to encrypt the DRAM 106 (block 352). Further, the encryption logic 132 destroys the encryption key 124 but maintains the wrapped encryption key 122 (block 352). When the DRAM 106 has been encrypted (block 352), the platform 100 is placed in sleep state (block 354). The illustrated example then ends (block 356).

Regarding FIG. 3D, as described above, control is passed to FIG. 3D when a new passphrase has been entered to activate the secure sleep state (blocks 320-324) or when a matching passphrase has been entered at a later time when the platform is resuming (blocks 332-336). In the illustrated example, the secure sleep detector 136 determines whether the platform 100 is being resumed from a secure sleep state (block 358). If not, control has arrived at FIG. 3D in response to a new passphrase being entered and the DRAM 106 does not need to be decrypted. Otherwise, if the platform 100 is being resumed from the secure sleep state, the DRAM 106 needs to be decrypted. Thus, if it is determined that the platform 100 is being resumed from the secure sleep state at block 358, the wrapping key deriver 200 re-derives the wrapping key and the unwrapper 202 unwraps the wrapped encryption key 122 (block 360). Using the unwrapped encryption key, the decryption logic 204 decrypts the DRAM 106 (block 362). Further, if the entire DRAM 106 has been decrypted, the key destroyer 206 destroys the encryption key 124 used to decrypt the DRAM 106, as well as the wrapped encryption key 122 from which that encryption key was obtained (block 364). As described above, the keys are preserved if, for example, the platform 100 is placed in the sleep state before the DRAM 106 is completely decrypted or if the platform 100 is placed in any other state (e.g., a hibernation state) before the DRAM 106 is completely decrypted. Control then proceeds to block 366. Control also proceeds to block 366 from block 358 when it is determined that the platform 100 is not being resumed from the secure sleep state.

The key generator 118 generates and stores a new random encryption key 124 for use in encrypting the DRAM 106 in the event that the platform 100 is again placed in the sleep state (block 366). Further, the encryption key 124 is wrapped in the wrapping key generated at block 324 or block 334. The wrapped encryption key 122 is stored in the BIOS memory 120 (block 370). The wrapping key used to generate the wrapped encryption key 122 is destroyed (block 372). The OS 104 is then resumed (block 374) and ran (block 376). Control then passes to FIG. 3C, which is described above.

Figure 4:
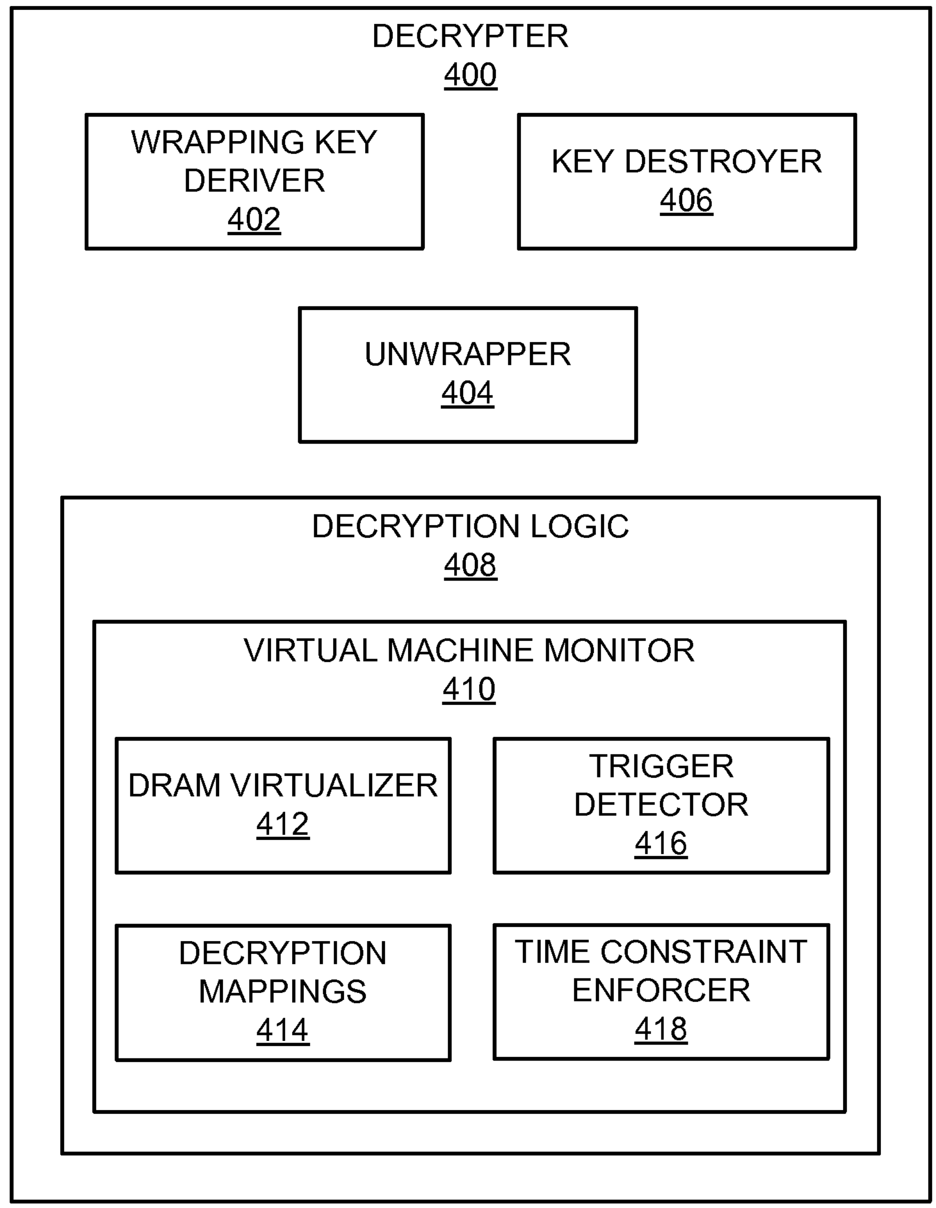
FIG. 4 is a block diagram of a second example implementation of the example decrypter of FIG. 1.

FIG. 4 is another example implementation of the decrypter 140 of FIG. 1. Like the example implementation of the decrypter 140 shown in FIG. 2 and described above, the example decrypter 400 of FIG. 4 includes a wrapping key deriver 402, an unwrapper 404 and a key destroyer 406 that operate similarly to the wrapping key deriver 200, the unwrapper 202 and the key destroyer 206 of FIG. 2 to obtain a key for use in decrypting the DRAM 106. However, the example decrypter 400 of FIG. 4 includes different decryption logic 408 than the example decrypter 140 of FIG. 2. In particular, the example decryption logic 408 of FIG. 4 utilizes a virtual machine monitor (VMM) 410 to enable the decrypter 400 to decrypt regions or portion of the DRAM 106 in an on-demand fashion as the OS 104 is resuming. Thus, rather than waiting for each encrypted region of the DRAM 106 to be decrypted before passing control from the BIOS 102 to the OS 104 (as described above in connection with FIG. 2), the example decrypter 400 of FIG. 4 decrypts certain critical regions of DRAM 106, then allows the OS 104 to resume when the critical regions of the DRAM 106 have been decrypted, and then begins decrypting remaining encrypted regions of the DRAM 106 as those regions are accessed by the OS 104. In doing so, the example decrypter 400 of FIG. 4 addresses additional latency issues associated with having to decrypt the DRAM 106 when resuming from the sleep state. For example, the virtualization utilized by the example decrypter 400 of FIG. 4 enables the OS 104 to resume its most critical functionality through decryption of the corresponding regions first and then to decrypt the remaining DRAM 106 in an on-demand fashion or, in other words, as needed by the OS 104. As a result, the OS 104 can be resumed and executed, at least partially, without having to wait for all of the encrypted regions of the DRAM 106 to be decrypted, which could take a significant amount of time when the DRAM 106 is relatively large.

When the platform 100 is resuming from the secure sleep state provided by the secure sleep state module 108, the BIOS 102 and the secure sleep state module 108 perform the initial operations described above in connection with FIGS. 1-3 to transition the platform 100 to the ON state, such as re-deriving the encryption key for use in the decryption process (e.g., via the wrapping key deriver 402 and the unwrapper 404). However, in the example of FIG. 4, the decrypter 400 launches the VMM 410 to decrypt the DRAM 106. In the illustrated example, the VMM 410 is loaded (e.g., when the secure sleep state is first enabled) into the BIOS memory 120 (e.g., SMRAM) and/or any other memory not accessible to the OS 104. The example VMM 410 of FIG. 4 is relatively small and is limited to virtualizing the DRAM 106. That is, aside from the DRAM 106, the VMM 410 leaves other components under the control of the OS 104.

To virtualize the DRAM 106, the example VMM 410 includes a DRAM virtualizer 412. The example DRAM virtualizer 412 virtualizes the DRAM 106 using any suitable technique. For example, the DRAM virtualizer 412 can virtualize the DRAM 106 via Extended Page Tables (EPTs). When using EPTs to virtualize the DRAM 106, the DRAM virtualizer 412 creates the EPTs to map guest physical addresses to host physical addresses. Page tables (PTs) in the OS 104 map linear addresses to guest physical addresses. When a program in the OS 104 executes and accesses a linear address that is not in the PTs of the OS 104, a Page Fault (#PF) is triggered. In such instances, the #PF is handled by the OS 104. On the other hand, when there is no mapping between the corresponding guest physical address and a host physical address, an EPT violation is triggered. In the illustrated example, EPT violations are handled by the VMM 410 (rather than the OS 104).

As an alternative to EPTs, the example DRAM virtualizer 412 can virtualize the DRAM 106 via a virtual Translation Lookaside Buffer (TLB). When using a virtual TLB to virtualize the DRAM 106, the DRAM virtualizer 412 creates a copy of the PTs of the OS 104 and uses #PFs and/or other triggers to keep the copy consistent with the corresponding version in the OS 104. Similar to EPT violations described above, #PFs indicate to the VMM 410 that guest physical addresses are not mapped to host physical addresses when a virtual TLB has been used to virtualize the DRAM 106.

Thus, when the DRAM virtualizer 412 uses EPTs to virtualize the DRAM 106, EPT violations indicate that the VMM 410 needs to decrypt a corresponding region of the DRAM 106. In other words, when the DRAM virtualizer 412 uses EPTs to virtualize the DRAM 106, EPT violations (resulting from the OS 104 accessing a particular (encrypted) address of the DRAM 106) trigger the VMM 410 to handle the exception such that the particular address of the DRAM 106 is decrypted for use by the OS 104. Similarly, when the DRAM virtualizer 412 uses a virtual TLB to virtualize the DRAM 106, #PFs indicate that the VMM 410 needs to decrypt a corresponding region of the DRAM 106. In other words, when the DRAM virtualizer 412 uses a virtual TLB to virtualize the DRAM 106, #PFs (resulting from the OS 104 accessing a particular (encrypted) address of the DRAM 106) trigger the VMM 410 to handle the exception such that the particular address of the DRAM 106 is decrypted for use by the OS 104. Additional or alternative types of virtualization and/or triggers can be utilized by the example VMM 410 to virtualize the DRAM 106 and/or to trigger the VMM 410 to handle an instance of the OS 104 trying to access an encrypted region of the DRAM 106 and, thus, a need to decrypt the DRAM 106.

In the illustrated example, when the VMM 410 is initially launched, the first region(s) of the DRAM 106 to be decrypted are the critical regions tracked in the encryption map 134 described above in connection with FIG. 1. The encryption map 134 indicates which regions of the DRAM 106 correspond to the critical regions of the DRAM 106, such as the regions needed by the OS 104 to initiate or begin resuming. The example VMM 410 utilizes the encryption map 134 to decrypt the critical regions such that the OS 104 can resume and begin executing. When the VMM 410 decrypts a region of the DRAM 106, the decrypted regions are stored in decryption mappings 414. As described above, the decryption mapping 414 can include, for example, an EPT, a virtual TLB or whichever type of virtualization table is being used by the DRAM virtualizer 412 to virtualize the DRAM 106. In other words, as regions of the DRAM 106 are decrypted, those regions are added to the decryption mappings 414. Thus, the decryption mappings 414 track which regions of the DRAM 106 have been decrypted.

In the illustrated example, when the critical region(s) of the DRAM 106 have been decrypted the OS 104 begins executing. Execution of the OS 104 includes attempting to access (e.g., read from and/or write to) certain addresses in the DRAM 106. As described above, when the OS 104 attempts to access an address in DRAM 106 that has not yet been decrypted, a trigger will be generated. In the illustrated example, such a trigger is generated when the decryption mappings 414 do not include an entry corresponding to the address that the OS 104 attempted to access. For example, when the decryption mappings 414 are implemented via EPTs, an EPT violation (e.g., a trigger) results from the OS 104 attempting to access an address that does not (yet) have a corresponding entry in the EPTs. Alternatively, when the decryption mappings 414 are implemented via a virtual TLB, a #PF (e.g., a trigger) results from the OS 104 attempting to access an address that does not (yet) have a corresponding entry in the virtual TLB. The example VMM 410 includes a trigger detector 416 that detects such triggers. When the example trigger detector 416 determines that the OS 104 has accessed (or tried to access) particular region(s) of the DRAM 106 that have not yet been decrypted (and, thus, do not have a corresponding entry in the decryption mappings 414), the example VMM 410 decrypts those region(s) of the DRAM 106. As described above, the encryption key used to encrypt the DRAM 106 is re-derived by the wrapping key deriver 402 and the unwrapper 404. In the illustrated example, the VMM 410 and the decryption logic 408 of FIG. 4 use the re-derived encryption key to decrypt the region(s) of the DRAM 106 that caused the corresponding trigger. That is, the VMM 410 enables the example decrypter 400 of FIG. 4 to decrypt regions of the DRAM 106 as the OS 104 accesses those regions (e.g., in an on-demand manner). When the region(s) of the DRAM 106 corresponding to the current trigger have been decrypted, the decryption mappings 414 are updated to include entries mapped to those region(s). For example, when the DRAM virtualizer 412 uses EPTs to virtualize the DRAM 106, the decrypted region(s) of the DRAM 106 are added to the EPTs. Alternatively, when the DRAM virtualizer 412 uses a virtual TLB to virtualize the DRAM 106, the decrypted region(s) of the DRAM 106 are added to the PTs of the TLB.

In some examples, rather than adding entries to the decryption mappings 414 as the DRAM 106 is decrypted and triggering the VMM 410 to decrypt the DRAM 106 when the OS 104 attempts to access a region not having an entry in the decryption mappings 414, the example decrypter 400 can utilize a bit designated to indicate whether a corresponding region in DRAM 106 is still encrypted. In particular, the decryption mappings 414 can be generated at the onset of the decryption process to reflect the encrypted DRAM 106 by including corresponding entries for each of the regions of the encrypted DRAM 106. Further, a bit can be added to the entries of the PTs of the decryption mappings 414. When the bit for a particular region is set (e.g., to '1' or true), that region is still encrypted. On the other hand, when the bit for a particular region is not set (e.g., '0' or false), that region has been decrypted. In such instances, when the OS 104 attempts to access a region of the DRAM 106, the corresponding bit is checked. If the bit is set, a trigger (e.g., an EPT violation or a #PF) is generated and, thus, the corresponding region of the DRAM 106 is decrypted. If the bit is not set, no decryption is necessary because the corresponding region of the DRAM 106 is no longer encrypted.

When all of the encrypted regions of the DRAM 106 have been decrypted (e.g., during an iteration of the platform 100 resuming from the secure sleep state), the VMM 410 passes control to the OS 104, thereby completing the resuming of the OS 104 from the secure sleep state. In some examples, a mechanism is used to ensure that the DRAM 106 is decrypted within a certain (e.g., predefined) period of time. For example, the VMM 410 of FIG. 4 includes a time constraint enforcer 418 that includes an adjustable or fixed period of time corresponding to a time limit for decrypting the DRAM 106 in the on-demand manner described above. In other words, the example time constraint enforcer 418 allows the VMM 410 to, for the defined period of time, decrypt the DRAM 106 region by region as the OS 104 accesses different portions of the DRAM 106. If the defined period of time has expired and the entire DRAM 106 has not been decrypted, the example time constraint enforcer 418 cause the decryption logic 408 to begin decrypting the DRAM 106 without regard to access attempts by the OS 104. As a result, even portions of the DRAM 106 that the OS 104 has not yet tried to access since being resumed from the secure sleep state will be decrypted when the period of time has expired.

In some examples, enforcement of the time limit by the time constraint enforcer 418 includes setting a VMX-preemption timer associated with the VMM 410. In particular, the VMX-preemption timer can be set to periodically transfer control to the VMM 410 to enable the VMM 410 to decrypt the DRAM 106 in a predefined manner (e.g., the numerically next address(es) in an encrypted address space of the DRAM 106). As a result, the VMM 410 decrypts region(s) of the DRAM 106 after each revolution of the VMX-preemption timer of the time constraint enforcer 418 in addition to the on-demand decryption of the DRAM 106 (e.g., in response to a EPT violation or a #PF). Thus, the DRAM 106 is eventually decrypted within the period of time even when the OS 104 is not accessing the DRAM 106 and, thus, not triggering decryption.

Additionally or alternatively, enforcement of the time limit by the time constraint enforcer 418 can utilize one or more idle loops of the OS 104. Such loops are implemented with interrupt instructions (e.g., STIs) followed by a halt instruction (e.g., HLT), which halts the OS 104 until the next external interrupt occurs. In such instances, when a halt instruction is issued in connection with the OS 104, the VMM 410 can receive control and, thus, be able to decrypt region(s) of the DRAM 106, until the next interrupt is triggered. Such an approach allows the VMM 410 to decrypt regions of the DRAM 106 when the OS 104 is not busy, thereby avoiding using resources when the OS 104 is busy.

The size(s) of the pages mapped in the EPTs or the virtual TLB can be any suitable size such as, for example, 4 k, 2 MB, 1 GB, etc. A smaller page size results in shorter decryption time each time a trigger (e.g., an EPT violation or a #PF) occurs, but also results in a longer overall time before the entire DRAM 106 is decrypted. In the illustrated example, the decrypter 140 sets the size(s) of the pages based on heuristics such as, for example, DRAM size, CPU speed, DRAM speed, bus speed, etc.

While an example manner of implementing the decrypter 140 of FIG. 1 has been illustrated in FIG. 4, one or more of the elements, processes and/or devices illustrated in FIG. 4 may be combined, divided, re-arranged, omitted, eliminated and/or implemented in any other way. Further, the example wrapping key deriver 402, the example unwrapper 404, the example key destroyer 406, the example decryption logic 408, the example VMM 410, the example DRAM virtualizer 412, the example decryption mappings 414, the example trigger detector 416, the example time constraint enforcer 418 and/or, more generally, the example decrypter 400 of FIG. 4 may be implemented by hardware, software, firmware and/or any combination of hardware, software and/or firmware. Thus, for example, any of the example wrapping key deriver 402, the example unwrapper 404, the example key destroyer 406, the example decryption logic 408, the example VMM 410, the example DRAM virtualizer 412, the example decryption mappings 414, the example trigger detector 416, the example time constraint enforcer 418 and/or, more generally, the example decrypter 400 of FIG. 4 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended system or apparatus claims of this patent are read to cover a purely software and/or firmware implementation, at least one of the example wrapping key deriver 402, the example unwrapper 404, the example key destroyer 406, the example decryption logic 408, the example VMM 410, the example DRAM virtualizer 412, the example decryption mappings 414, the example trigger detector 416, the example time constraint enforcer 418 and/or, more generally, the example decrypter 400 of FIG. 4 are hereby expressly defined to include a tangible computer readable storage medium such as a memory, DVD, CD, Blu-ray, etc. storing the software and/or firmware. Further still, the example decrypter 400 of FIG. 4 may include one or more elements, processes and/or devices in addition to, or instead of, those illustrated in FIG. 4, and/or may include more than one of any or all of the illustrated elements, processes and devices.

Figure 5:
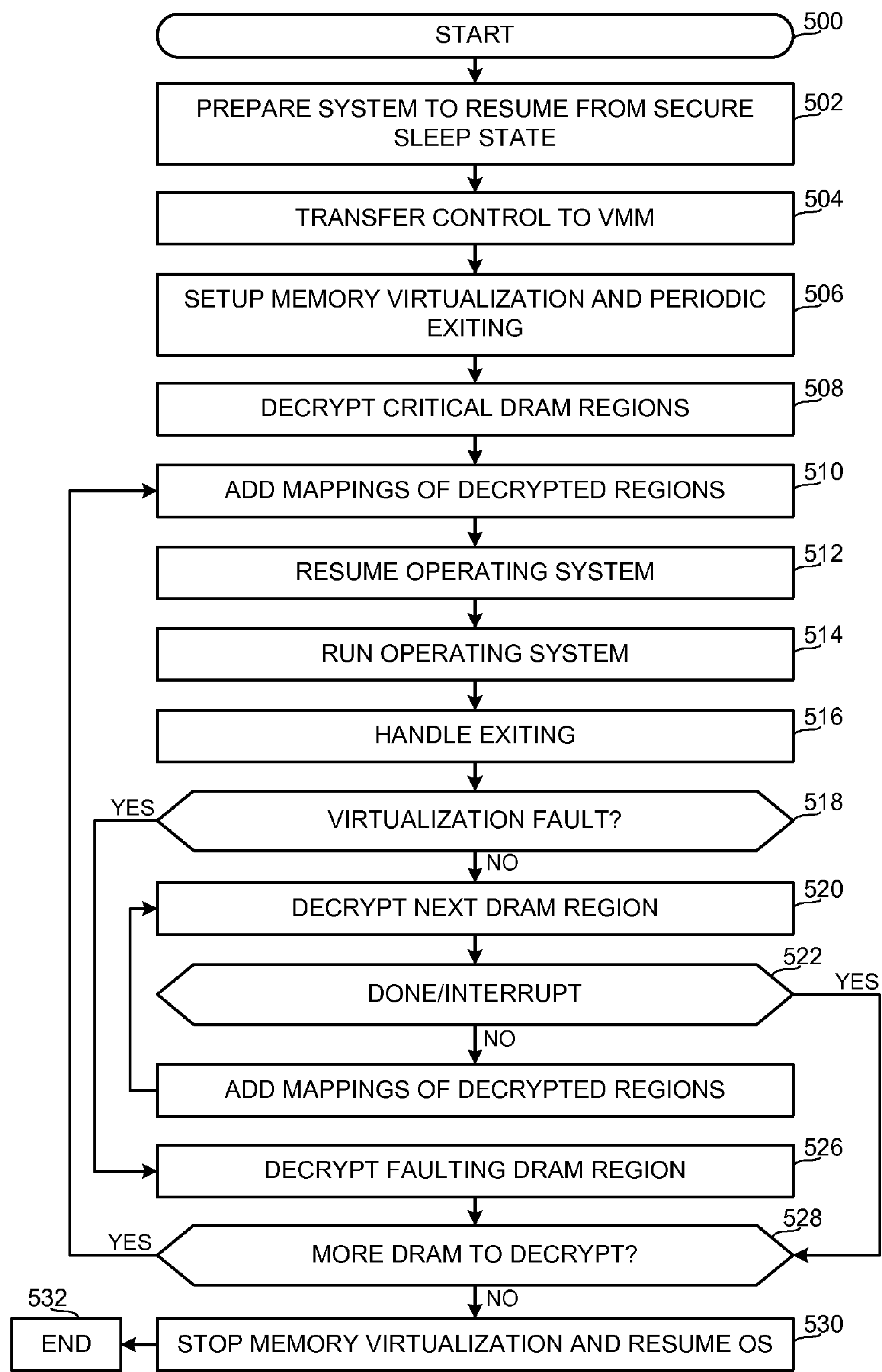
FIG. 5 is a flowchart representative of example machine readable instructions that may be executed to implement the example decrypter of FIG. 4.

FIG. 5 is a flowchart representative of example machine readable instructions for implementing the example decrypter 400 of FIG. 4. In the example flowchart of FIG. 5, the machine readable instructions comprise program(s) for execution by a processor such as the processor 612 shown in the example computer 600 discussed below in connection with FIG. 6. The program(s) may be embodied in software stored on a tangible computer readable medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program(s) is described with reference to the flowchart illustrated in FIG. 5, many other methods of implementing the example decrypter 400 of FIG. 4 may alternatively be used. For example, the order of execution of the blocks may be changed, and/or some of the blocks described may be changed, eliminated, or combined.

As mentioned above, the example processes of FIG. 5 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIG. 5 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 5 begins with an indication that the computing platform 100 is to transition from the secure sleep state disclosed herein to an ON state (block 500). The BIOS 102 prepares the platform 100 to resume from the secure sleep state by, for example, loading one or more drivers and/or tests needed to resume the platform 100 (block 502). When the BIOS 102 determines that decryption of the DRAM 106 is to be performed, control is passed to the VMM 410 (block 504). The DRAM virtualizer 412 virtualizes the DRAM 106 using any suitable technique such as, for example, EPTs or a virtual TLB, as described above (block 506). Further, in the illustrated example of FIG. 5, the time constraint enforcer 418 sets up a timer that will cause the OS 104 to periodically transfer control to the VMM 410 (block 506). As described above, the periodic transfer of control to the VMM 410 enforces a time limit for the DRAM 106 to be decrypted.

When the DRAM 106 has been virtualized (e.g., and the virtualization tables have been stored in the decryption mappings 414), the VMM 410 and the decryption logic 408 decrypt the critical region(s) of the DRAM 106 (block 508). The critical region(s), which represent portions of the DRAM 106 that are needed for the OS 104 to begin assuming control of the platform 100, are tracked in the encryption mapping 134 created upon encryption of the DRAM 106. The decryption of the critical region(s) is added to the decryption mappings 414 so that the decrypter 400 can track which parts of the DRAM 106 have been decrypted thus far.

The platform 100 then resumes and runs the OS 104 (block 512 and 514). That is, the OS 104 begins handling normal operation of the document(s) and/or application(s), the state of which was preserved during the secure sleep state. As the OS 104 executes instructions, a trigger (e.g., an EPT violation or a #PF) may occur when the OS 104 attempts to access encrypted portion(s) of the DRAM 106, or a periodic time interval set up by the time constraint enforcer 418 may expire. In such instances, the OS 104 incurs an exit and control is passed to the VMM 410 (block 516). If control has passed to the VMM 410 due to a virtualization fault (e.g., an EPT violation or a #PF) (block 518), the corresponding faulting region(s) of the DRAM 106 are decrypted (block 526). If the decryption mappings 414 indicate that encrypted region(s) of the DRAM 106 remain (block 528), control passes to block 510). Otherwise, if the entire DRAM 106 has been decrypted (block 528), the virtualization process is ended (block 530) and the example of FIG. 5 ends (block 532).

Referring back to block 518, if the exit from the OS 104 does not correspond to a virtualization fault, the VMM 410 decrypts region(s) of the DRAM 106 (e.g., the next sequential encrypted region(s) according to an address space organization) (block 520). As described above, such an exit from the OS 104 may correspond to, for example, an expiration of the VMX-preemption timer or an indication that the OS 104 is idle. When the VMM 410 has decrypted the intended region(s) of the DRAM (e.g., when the exit from the OS 104 corresponded to an expiration of the timer) or when an interrupt occurs in the OS 104 (e.g., when the exit from the OS 104 corresponded to the OS 104 being idle) (block 522), control passes to block 528. Otherwise, if the VMM 410 has more region(s) of the DRAM 410 to decrypt (e.g., when the exit from the OS 104 corresponded to an expiration of the timer) or when no interrupt has occurred in the OS 104 (e.g., when the exit from the OS 104 corresponded to the OS 104 being idle) (block 522), the decryption of the region(s) of the DRAM 106 is added to the decryption mappings 414 (block 524) and control returns to block 520.

Figure 6:
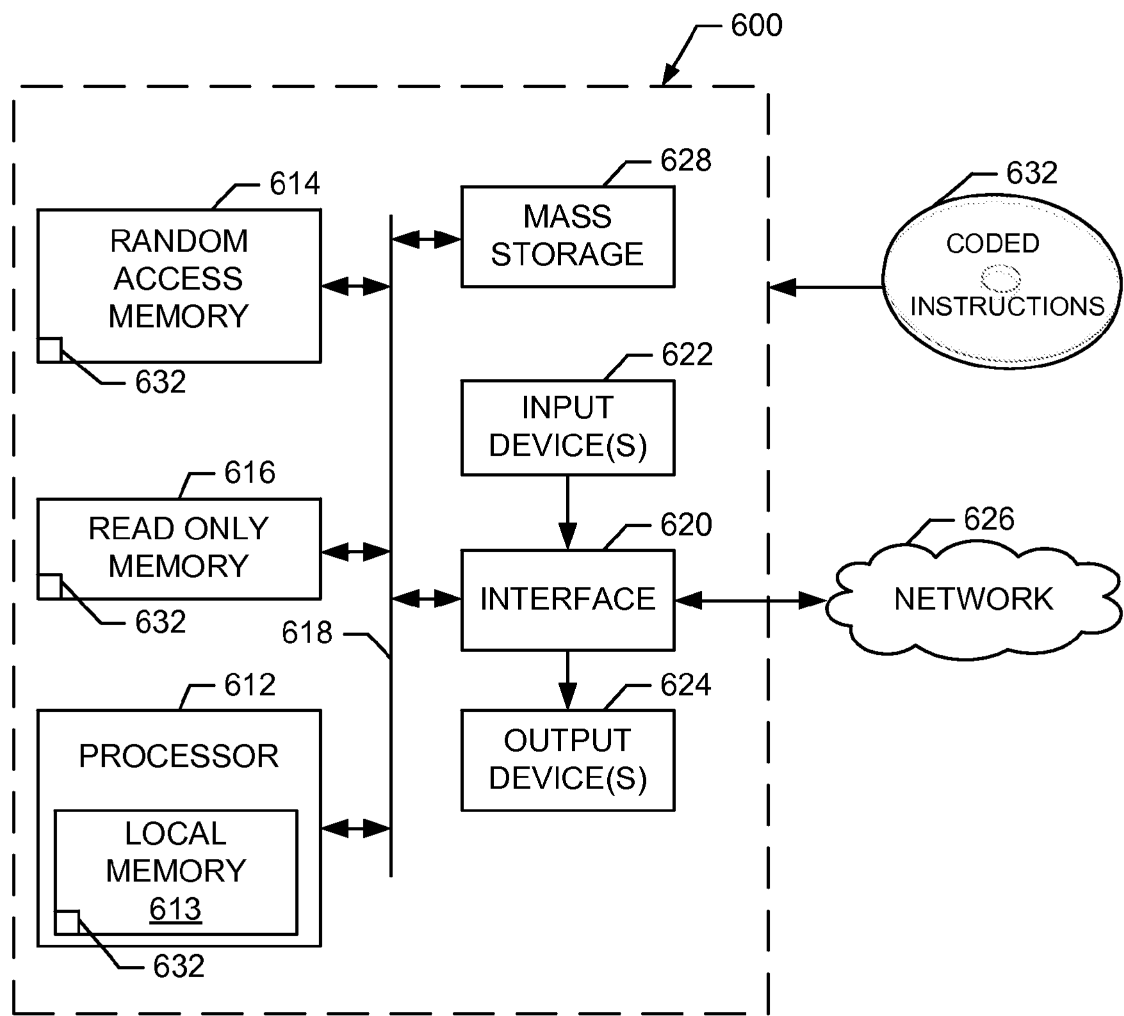
FIG. 6 is a block diagram of an example processing system capable of executing the example machine readable instructions of FIGS. 3A-D to implement the example secure sleep state module of FIG. 1 and/or the example machine readable instructions of FIG. 5 to implement the example decrypter of FIG. 4.

FIG. 6 is a block diagram of a processor platform 600 capable of executing the instructions of FIGS. 3A-3D to implement the example platform 100 of FIGS. 1 and 2 and/or the instructions of FIG. 5 to implement the example decrypter 400 of FIG. 4. The processor platform 600 can be, for example, a server, a personal computer, an Internet appliance, a DVD player, a CD player, a Blu-ray player, a gaming console, a personal video recorder, a smart phone, a tablet, a printer, or any other type of computing device.

The processor platform 600 of the instant example includes a processor 612. For example, the processor 612 can be implemented by one or more microprocessors or controllers from any desired family or manufacturer.

The processor 612 includes a local memory 613 (e.g., a cache) and is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 also includes an interface circuit 620. The interface circuit 620 may be implemented by any type of interface standard, such as an Ethernet interface, a universal serial bus (USB), and/or a PCI express interface.

One or more input devices 622 are connected to the interface circuit 620. The input device(s) 622 permit a user to enter data and commands into the processor 612. The input device(s) can be implemented by, for example, a keyboard, a mouse, a touchscreen, a track-pad, a trackball, isopoint and/or a voice recognition system.

One or more output devices 624 are also connected to the interface circuit 620. The output devices 624 can be implemented, for example, by display devices (e.g., a liquid crystal display, a cathode ray tube display (CRT), a printer and/or speakers). The interface circuit 620, thus, typically includes a graphics driver card.

The interface circuit 620 also includes a communication device such as a modem or network interface card to facilitate exchange of data with external computers via a network 626 (e.g., an Ethernet connection, a digital subscriber line (DSL), a telephone line, coaxial cable, a cellular telephone system, etc.).

The processor platform 600 also includes one or more mass storage devices 628 for storing software and data. Examples of such mass storage devices 628 include floppy disk drives, hard drive disks, compact disk drives and digital versatile disk (DVD) drives.

The coded instructions 632 of FIGS. 3A-3D and/or 5 may be stored in the mass storage device 628, in the volatile memory 614, in the non-volatile memory 616, and/or on a removable storage medium such as a CD or DVD.

Example methods include, in response to an initiation of a sleep state of a computing platform, encrypting a memory of the computing platform, and decrypting the memory when resuming the computing platform from the sleep state, wherein placing the computing platform in the sleep state includes powering down a portion of the computing platform and preserving a state of the computing platform.

Some example methods further include using a passphrase to generate a wrapping key to wrap a randomly generated encryption key to form a wrapped encryption key.

Some example methods further include destroying the passphrase after generating the wrapping key and before encrypting the memory with the encryption key.

Some example methods further include destroying the encryption key and preserving the wrapped encryption key after encrypting the memory. The example method may also include verifying a correct passphrase prior to decrypting the memory.

Some example methods further include, when resuming from the sleep state, deriving an encryption key based on the passphrase and a stored wrapped encryption key.

In some example methods, decrypting the memory includes virtualizing the encrypted memory.

Some example methods further include decrypting a first portion of the memory in response to an operating system attempting to access the first portion of the memory that is encrypted.

Some example methods further include decrypting a second portion of the memory in response to the operating system being idle.

Some example methods further include decrypting a second portion of the memory in response to a predefined period of time ending.

Example tangible machine readable storage media include instructions that, when executed, cause a machine to at least, in response to an initiation of a sleep state of a computing platform, encrypt a memory of the computing platform; and decrypt the memory when resuming the computing platform from the sleep state, wherein placing the computing platform in the sleep state includes powering down a portion of the computing platform and preserving a state of the computing platform.

In some examples, the instructions cause the machine to use a passphrase to generate a wrapping key to wrap a randomly generated encryption key to form a wrapped encryption key.

In some examples, the instructions cause the machine to destroy the passphrase after generating the wrapping key and before encrypting the memory with the encryption key.

In some examples, the instructions cause the machine to destroy the encryption key and preserve the wrapped encryption key after encrypting the memory.

In some examples, the instructions cause the machine to verify a correct passphrase prior to decrypting the memory.

In some examples, the instructions cause the machine to, when resuming from the sleep state, derive an encryption key based on the passphrase and a stored wrapped encryption key.

In some examples, the instructions cause the machine to decrypt the memory by virtualizing the encrypted memory.

In some examples, the instructions cause the machine to decrypt the memory by decrypting a first portion of the memory in response to an operating system attempting to access the first portion of the memory that is encrypted.

In some examples, the instructions cause the machine to decrypt the memory by decrypting a second portion of the memory in response to the operating system being idle.

Example apparatus include a detector to determine that a computing platform is to be placed in a sleep state, wherein a current state of the computing platform is to be preserved during the sleep state; and an encrypter to encrypt a memory of the computing platform in the current state when the detector detects an initiation of the sleep state; and a decrypter to decrypt the memory when resuming the computing platform from the sleep state.

Some example apparatus further include a key generator to use a passphrase to generate a wrapping key to wrap a randomly generated encryption key to form a wrapped encryption key, the passphrase to be destroyed after generation of the wrapping key and before encryption of the memory with the encryption key.

In some example apparatus, the encryption key may be destroyed and the wrapped encryption key may be preserved after encryption of the memory.

In some example apparatus, the decrypter, when resuming from the sleep state, is to derive an encryption key using a passphrase provided by a user and a stored wrapped encryption key.

In some example apparatus, the decrypter is to decrypt the memory by decrypting a first portion of the memory in response to an operating system attempting to access the first portion of the memory that is encrypted.

In some example apparatus, the decrypter is to decrypt the memory by decrypting a second portion of the memory in response to the operating system being idle.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A method to manage secure sleep state transitions in a computing platform including at least one processor, an operating system to control the computing platform, a basic input/output system to boot the computing platform, and a main memory, the method comprising:

in response to a trigger to place the computing platform in a secure sleep state:

encrypting content in the main memory, the content in the main memory including critical regions which must be decrypted before the operating system can control operation of the computing platform and other regions which do not need to be decrypted before the operating system can control the operation of the computing platform; and, placing the computing platform in the secure sleep state;

in response to an initiation of a resume procedure to resume the computing platform from the secure sleep state:

booting the computing platform with the basic input/output system;

before passing control of the computing platform from the basic input/output system to the operating system, initiating a virtual machine monitor to execute on the at least one processor;

decrypting the critical regions of the main memory with the virtual machine monitor executing on the at least one processor; and after the critical regions of the main memory have been decrypted and before the other regions of the main memory which do not need to be decrypted before the operating system can control the operation of the computing platform have been decrypted, passing control of the computing platform from the basic input/output system to the operating system; and after the operating system has received control of the computing platform from the basic input/output system and in response to at least one of a fault or violation triggered by an attempt to access the main memory:

decrypting, with the virtual machine monitor executing on the at least one processor, the data at a location in at least one of the other regions of the main memory.

2. The method as defined in claim 1, wherein the fault or violation is triggered by the operating system attempting to access the data at the location in the at least one of the other regions of the main memory.

3. The method as defined in claim 1, further including generating a first table to track which portions of the main memory have been decrypted.

4. The method as defined in claim 3, wherein the at least one of the fault or violation is triggered when the operating system attempts to access an address of the main memory not having a corresponding entry in the first table.

5. The method as defined in claim 3, further including populating the first table with information associated with the location at the at least one of the other regions of the main memory in response to the decrypting of the data at the location at the at least one of the other regions of the main memory.

6. A The method as defined in claim 4, further including completing resumption of the operating system from the secure sleep state when each encrypted portion of the main memory has been decrypted.

7. The method as defined in claim 4, further including, when the main memory has not been completely decrypted within a time limit, decrypting a yet encrypted portion of the main memory without the at least one of the fault or violation being triggered by an access attempt to the yet encrypted portion of the main memory.

8. The method as defined in claim 1, further including generating a second table in connection with the encryption of the content of the main memory to indicate a first address of the main memory corresponding to the critical regions and a second address of the main memory corresponding to at least one of the other regions.

9. The method as defined in claim 1, wherein the critical regions of the main memory include at least one of locations or sizes of data structures required for the operating system to run upon the computing platform.

10. At least one tangible computer readable storage device comprising instructions that, when executed, cause a computing platform to at least:

in response to a trigger to place the computing platform in a secure sleep state:

encrypt content in a main memory of the computing platform, the content in the main memory including a first region which must be decrypted before control of the computing platform can be passed from a basic input/output system (BIOS) to a main operating system and a second region which does not need to be decrypted before control of the computing platform can be passed from the BIOS to the main operating system; and, place the computing platform in the secure sleep state;

in response to initiation of a resume procedure to resume the computing platform from the secure sleep state:

boot the computing platform with the BIOS;

before passing control of the computing platform from the BIOS to the main operating system, initiate a virtual machine monitor (VMM);

decrypt the first region of the main memory with the VMM; and after the first region of the main memory has been decrypted and before the second region of the main memory has been decrypted, pass control of the computing platform from the BIOS to the main operating system; and after the operating system has received control of the computing platform from the BIOS and in response to at least one of a fault or violation triggered by an attempt to access the main memory, decrypt at least a portion of the second region of the main memory with the VMM.

11. The at least one storage device as defined in claim 10, wherein the at least one of the fault or the violation is triggered by the operating system attempting to access the at least the portion of the second region of the main memory.

12. The at least one storage device as defined in claim 10, wherein the instructions, when executed, cause the computing platform to generate a first table to track which portions of the main memory have been decrypted.

13. The at least one storage device as defined in claim 12, wherein the at least one of the fault or the violation is triggered when the operating system attempts to access an address of the main memory not having a corresponding entry in the first table.

14. The at least one storage device as defined in claim 12, wherein the instructions, when executed, cause the computing platform to populate the first table with information associated with the at least the portion of the second region of the main memory in response to the decrypting of the at least the portion of the second region of the main memory.

15. The at least one storage device as defined in claim 13, wherein the instructions, when executed, cause the computing platform to complete resumption of the operating system from the secure sleep state when every encrypted portion of the main memory has been decrypted.

16. The at least one storage device as defined in claim 13, wherein, when the main memory has not been completely decrypted within a time limit, the instructions, when executed, cause the computing platform to decrypt a yet encrypted portion of the main memory without the at least one of the fault or violation being triggered by an access attempt to the yet encrypted portion of the main memory.

17. The at least one storage device as defined in claim 10, wherein the instructions, when executed, cause the computing platform to generate a second table in connection with encryption of the main memory to indicate a first address of the main memory corresponding to the first region and a second address of the main memory corresponding to the second region.

18. The at least one storage device as defined in claim 10, wherein the first region of the main memory includes at least one of locations or sizes of data structures required for the operating system to run upon the computing platform.

19. A computing device, comprising:

at least one processor;

an operating system to control the computing device;

a basic input/output system (BIOS) to boot the computing device;

main memory including a critical region which must be decrypted before the operating system can control operation of the computing device and an other region which does not need to be decrypted before the operating system can control the operation of the computing device;

in response to a first trigger to place the computing device in a secure sleep state, the at least one processor to:

encrypt content in the main memory; and, place the computing device in the secure sleep state; and in response to a second trigger to resume the computing device from the secure sleep state, the processor to:

boot the computing platform with the BIOS;

before passing control of the computing device from the BIOS to the operating system, initiate a virtual machine monitor (VMM) to execute on the at least one processor;

decrypt the critical region of the main memory with the VMM; and after the critical region of the main memory has been decrypted and before the other region of the main memory has been decrypted, pass control of the computing device from the BIOS to the operating system; and after the operating system has received control of the computing device from the BIOS and in response to at least one of a fault or violation triggered by an attempt to access the main memory, the VMM to decrypt data at a location in the other region of the main memory.

20. The computing device as defined in claim 19, wherein the fault or violation is triggered by the operating system attempting to access the data at the location in the other region.

21. The computing device as defined in claim 19, wherein the at least one processor is to generate a first table to track decryption of the main memory.

22. The computing device as defined in claim 21, wherein the at least one of the fault or the violation is triggered when the operating system attempts to access a portion of the main memory not having a corresponding entry in the first table.

23. The computing device as defined in claim 21, wherein the at least one processor is to populate the first table with information associated with the location in the other region of the main memory in response to the decrypting of the data at the location in the other region of the main memory.

24. The computing device as defined in claim 21, wherein the processor is to complete resumption of the operating system from the secure sleep state when the encrypted portion of the main memory has been completely decrypted.

25. A The computing device as defined in claim 21, wherein, when the main memory has not been completely decrypted within a time limit, the at least one processor is to decrypt a yet encrypted portion of the main memory without the at least one of the fault or violating being triggered by an access attempt to the yet encrypted portion of the main memory.

26. A The computing device as defined in claim 19, wherein the at least one processor is to generate a second table in connection with the encryption of the main memory to indicate a first address of the main memory corresponding to the critical region and a second address of the main memory corresponding to the other region.

27. A The computing device as defined in claim 19, wherein the critical region of the main memory includes at least one of locations or sizes of data structures required for the operating system to run upon the computing device.

* * * * *